Patented July 13, 1943

2,323,928

UNITED STATES PATENT OFFICE 2,323,928

SOIL STABILIZATION

Abraham B. Miller, Newark, Del., assignor to Hercules Powder Company, Wilmington, Del., a corporation of Delaware No Drawing. Application February 9, 1940, Serial No. 318,201

11 Claims. (Cl. 106—241)

This invention relates to soil stabilization, and more particularly to stabilizing soil by mixing therewith a powdered resin.

Soil stabilization is a treatment of soils, especially existing road soils, so that they are more suitable as road building materials. In doing this, natural deficiencies of the soil are corrected. For example, in the case of some roads, poor load bearing qualities are taken care of. In the case of other roads where they have poor moisture resistance, they are stabilized to prevent rutting, frost heaving, and other phenomena associated with weakening of the road by water.

Heretofore, it has been proposed to stabilize soils by blending soils of various particle size and physical and chemical properties. For example, one type of soil may give strength and hardness for resisting abrasive action of traffic, while another may provide for interlocking of the soil grains and give an increase in shear strength. Then there should be enough clay-like material in the blend present to absorb water and maintain stability during dry weather. Silt might be desired to act as a filler and give a capillary bond in the presence of water when the clay present becomes weak by losing cohesion in wet weather. The difficulty with this method of stabilization is that in grading and selecting and blending the quantities of various types of road materials, an enormous volume of materials must be handled.

Stabilization of soil has been proposed through the addition of deliquescent materials to assist in maintaining the desired water content, to prevent dusting, and to prevent the road from becoming muddy in wet weather. Also water-soluble binders, such as sulfite liquor concentrate and distillery wastes have been proposed. Likewise, bituminous emulsions have found some application for stabilizing road soil.

An object of the present invention is to provide a material adapted to be mixed with the soil and thereby condition the soil so that it offers an improved resistance against the action of water in a more advantageous manner than by prior known stabilizing materials.

Another object is to provide a material adapted to be mixed with the soil so that the soil will not be softened or washed away by water and will not rut or become badly cut.

Another object is to provide a material adapted to prevent swelling and frost heave of soils.

Another object is to provide a material which will function with other soil stabilizers to make them more effective.

Another object is to provide a material which will not interfere with the armoring of secondary roads with a tar or asphalt coating and which conditions the soil to give a base upon which a sheet asphalt or Portland cement concrete pavement can be built.

Another object is to provide a material for stabilizing soils used in roads, levees, dams, embankments; soils adjacent underground pipe lines, conduits, foundations, and the like; and race tracks, tennis courts and playing fields or the like.

A further object is to provide a method of stabilizing soils adapted to accomplish the foregoing objects and advantages in a simple and economical manner.

In accordance with the invention, I have found that these objects can be accomplished by mixing with the soils a small quantity of a powdered substantially petroleum-hydrocarbon insoluble pine wood resin. The soils may or may not be adjusted first with the necessary aggregate or soil fines to bring the soils to the recognized mechanical analysis of the soils for optimum strength and serviceability. This resin, if desired, may be used and mixed with other stabilizers such as calcium chloride.

The material I use, which is characterized by the term "substantially petroleum-hydrocarbon insoluble pine wood resin" herein and in the appended claims, is the resinous material which may be prepared from pine wood, preferably from stump pine wood, in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum-hydrocarbon such as, for example, gasoline, dissolves and removes the rosin. After separation of the rosin, high in abietic acid, a resinous residue remains which is low in abietic acid. Alternatively, the residue of the initial coal tar hydrocarbon extract may be dissolved in gasoline and treated with furfural, and the two layers which form separated. The resinous residue is found dissolved in the furfural from which it may be obtained by evaporation of the furfural. This resinous residue, used in the composition of the present invention, is characterized by a dark red-brown color, cherry red in solution, and by substantial insolubility in petroleum hydrocarbons, but it will vary somewhat in its specific characteristics such as acid number, melting point, exact petroleum ether solubility, and content of naphtha and toluol insoluble material, depending upon the details of the extraction processes utilized. The resinous residue may be defoamed by steaming or heat treating to get rid of volatile substances.

Another method of producing this resin comprises treating the benzol extracted wood rosin with a mixture of gasoline and furfural which effectively dissolves the rosin in the gasoline and the resin in the furfural. The mixture is then permitted to stand and settle until two layers are formed which are separated. The furfural layer is then run through a still to remove the furfural and the resin is recovered.

This resin will meet or nearly meet the following specifications, namely substantial insolubility in petroleum hydrocarbons, substantially complete solubility in alcohol, a methoxy content from about 3% to about 7.5% (usually from about 4% to about 6%), an acid number in the range from about 80 to about 110, and a drop melting point in the range from about 95° C. to about 125° C.

By soil, I mean such materials as silt or clay or mixtures thereof, or mixtures of silt and/or clay with sand, cinders, pebbles, or aggregate, or any other material which by suitable mechanical or other treatment can be made suitable for use for the purposes mentioned above.

In using my improved material for stabilizing soils for example, in the building of roads, the soils may be first graded in the customary manner. The resin may be in the form of a powder adapted to pass about 80 mesh and may then be mixed with the soil. This mixing may be done prior to laying the road or may be done by scarifying, blading, or harrowing the road soil while adding the resin to work it into the soil and mix it therein. This latter method preferably is carried out when existing road soils are stabilized. Another method of mixing the resin may comprise dispersing the powdered resin in the water. This dispersion is facilitated by the addition of about 5 to 11% of the road soil to the water, which is sprinkled on the soil in compacting the road. Thereafter, the road is rolled to attain the desired degree of compaction.

The road so formed may be of the secondary type, commonly known as "dirt roads" and this road may be further improved by applying a wearing surface of asphalt or coal tar and chipped stone. If desired, the road may be used as a subgrade base for a first class highway of asphalt or Portland cement concrete.

In using the resin for stabilizing soils for race tracks, tennis courts, playing fields, and shoulder, levee, dam and fill constructions, the resin may be incorporated in the soil in a similar or any other suitable well known manner.

In practicing the invention between about .12 and 10% of the resin may be mixed with the soil, but preferably between about .25 and 2.5% of the resin may be used to produce good results. The percentage of resin may be varied according to the nature of the soil, some soils requiring more resin than others to attain the desired stabilization. The following examples illustrate the invention:

EXAMPLE I

A test road was constructed of a road comprising a Public Roads Authority class A-7 soil (a clay-like soil, without coarse material) which had on the surface of it about 1 to 1½ inches of Public Roads Authority class A-1 gravel (a subgrade mixture of well graded coarse and fine material). This mixture gave approximately a Public Roads Authority class A-4 soil (a silt soil without coarse material, with no appreciable sticky colloidal clay). This road was 20 feet wide, 800 feet long, and 6 inches deep. Powdered substantially petroleum-hydrocarbon insoluble pine wood resin was mixed with the soil by using 6.4 pounds of resin for every square yard of road or approximately 1.5% of resin by weight of the road soil. This road was wetted and compacted.

A control, or comparison section was prepared of the original road soil by mixing the class A-7 soil and class A-1 gravel and compacting the resulting class A-4 mixture to a depth of 6 inches. After about a year, cores were taken of the stabilized road, the control section and the original road to determine the respective moisture content of each, which were as follows:

|  | Moisture content per cent |
|---|---|
| Stabilized section | 4.4 |
| Control section | 10.4 |
| Original road | 9.8 |

These cores ware made after a ten-day period of rain. It was observed that in the stabilized section, the water penetrated only about ¼ inch and the soil was substantially bone dry beneath. Two months after the road was laid, the soil of the stabilized section reached a moisture content of about 4% and has subsequently fluctuated between about 4 and 5%. The road was observed to get less wet and slippery during a rain and dried out rapidly afterward.

EXAMPLE II

On a test track, the following sections were constructed:

| Section No. | Cecil clay [1] | Sand | Resin [2] |
|---|---|---|---|
|  | Percent | Percent | Percent |
| 1 | 100 | 0 | 0 |
| 2 | 50 | 50 | 0 |
| 3 | 25 | 75 | 0 |
| 4 | 50 | 50 | 1 |
| 5 | 25 | 75 | 1 |
| 6 | 100 | 0 | 2 |
| 7 | 50 | 50 | 2 |
| 8 | 25 | 75 | 2 |

[1] Clays of the type found in Cecil County, Maryland.
[2] Substantially petroleum-hydrocarbon insoluble pine wood resin.

A pair of wheels was set in motion, each wheel rotating with approximately 800 pounds pressure at the point of contact with the track. After four hours, there was a rut about ½ inch deep all around the track. The track was then sprinkled with water and kept wet for a day and a night. The wheels were set in motion again, this time each wheel rotating with approximately 1000 pounds pressure at the point of contact. At 50 revolutions, sections 1, 2, and 3 started to rut more than the others and at 100 revolutions rutted very badly. It was plainly observed that these unstabilized sections had absorbed the moisture, while the ones containing the resin had absorbed very little and showed good resistance against rutting.

EXAMPLE III

Tensile type briquettes were prepared of 50% Cecil clay and 50% sand as follows:

| Briquette No. | Resin [1] | CaCl$_2$ |
|---|---|---|
| | Percent | Percent |
| 1 | 0 | 0 |
| 2 | 0 | 5 |
| 3 | 1 | 4 |

[1] Substantially petroleum-hydrocarbon insoluble pine wood resin.

These briquettes were air dried and then shielded with paraffin, but leaving the necks thereof bare. One end of each briquette was held by a clamp and the other end and the neck of each were immersed in water, simultaneously, in separate beakers.

No. 1, which was untreated, began to flake almost immediately and after 12 minutes ruptured at the neck, leaching clay rapidly.

At about this time, leaching began to appear in No. 2 containing calcium chloride. After 26 minutes of immersion, No. 2 ruptured at its neck with strong leaching of clay.

No. 3 ruptured and fell to the bottom of the beaker after 3 hours and 50 minutes of immersion, but the clay did not leach out. Clay was still suspended in the beakers containing No. 1 and No. 2.

These tests demonstrated the superiority in slaking resistance of soils containing a small amount of resin over unstabilized or calcium chloride treated soils. They also revealed that the resin and calcium chloride can be used together to improve the characteristics of soils. Furthermore, they illustrate that the resin prevents leaching out of the clay, a very desirable feature because the loss of clay in road soils is very undesirable. To determine whether the advantages of the resin existed only over the first wetting and drying cycle, tests were made with tensile briquettes formed of material which had undergone one or more tests and contained 1% resin and 4% calcium chloride. The material was dried, pulverized, and consolidated again. It appeared that by reworking the soil, the stability was actually improved.

To further illustrate the advantages of using a resin in accordance with the invention, the following samples were prepared of a 50% Cecil clay and 50% sand mixture:

| Sample No. | Resin [1] | CaCl$_2$ |
|---|---|---|
| | Percent | Percent |
| 10 | 0 | 0 |
| 11 | 0 | 2.5 |
| 12 | .8 | 1.7 |
| 13 | 1.25 | 1.25 |
| 14 | 2.00 | .5 |
| 15 | 2.20 | .3 |
| 16 | 2.50 | 0 |

[1] Substantially petroleum-hydrocarbon insoluble pine wood resin

These samples were placed in boxes and were washed for two hours with uniform streams of water. The control sample (No. 10) containing no stabilizer was washed away entirely in 15 minutes.

About half of sample No. 11 was washed away. The remaining samples resisted erosion in the order of the increase in the amount of resin.

Samples Nos. 11 to 16 then were subjected to a rutting test, which comprised rolling a carriage weighing about 450 grams across each sample. The resistance to rutting was in the order of the increase in the amount of resin.

EXAMPLE IV

Samples of the compositions listed in the following table were prepared from Chester loam. This is a typical class A-4 soil dominantly silt and a small amount of clay. No sand or aggregate was used to bring it up to a proper mechanical analysis for optimum stabilization conditions. The samples were placed in boxes and patted or tamped therein. These samples were subjected to a 2-hour wash test, both damp and dry, the moisture content at the start of the wash test (same wash test as in Example III) being indicated. Thereafter the samples were subjected to the rutting test described in connection with Example III.

*Wash tests on Chester loam stabilized with resin and calcium chloride*

| Resin [1] | Calcium chloride | 2-hr. wash damp soil pats | | | 2-hr. wash dry soil pats | | |
|---|---|---|---|---|---|---|---|
| | | Moisture | Erosion | Rutting | Moisture | Erosion | Rutting |
| Per cent | Per cent | Per cent | | | Per cent | | |
| 0 | 0 | 15.3 | Sample ½ washed out | Deep | | Washed out | Deep. |
| 0 | 2 | 18.4 | ¼ surface pitted | Prac. none | 8.6 | Severe | Do. |
| 0 | 3 | 17.9 | ----do---- | ----do---- | 9.2 | ----do---- | Do. |
| 0 | 5 | 17.4 | None | None | 5.4 | Mod. severe | None. |
| 0.5 | 0 | 15.2 | ----do---- | ----do---- | 8.3 | None | Deep. |
| 0.5 | 3 | 17.3 | ----do---- | ----do---- | 9.5 | Mod. severe | Moderate. |
| 0.5 | 4.5 | | ----do---- | ----do---- | 5.4 | Slight | None. |
| 1 | 0 | 16.5 | ----do---- | ----do---- | 5.4 | None | Moderate. |
| 1 | 1 | 17.1 | V.slight surface pitting | ----do---- | 7.1 | Moderate | Do. |
| 1 | 2 | 15.5 | ¼ surface pitted | ----do---- | | Slight | Severe. |
| 1 | 4 | 18.2 | None | ----do---- | | Moderate | Deep. |
| 2 | 0 | 15.6 | ----do---- | ----do---- | | None | None. |
| 2 | 1 | 16.7 | ----do---- | ----do---- | 5.6 | V. slight | Slight. |
| 2 | 3 | 17.6 | ----do---- | ----do---- | 8.1 | Slight | Moderate. |

[1] Substantially petroleum-hydrocarbon insoluble pine wood resin.

Tensile briquettes of Chester loam containing various amounts of stabilizers were prepared and were subjected to the water immersion or slaking test described in connection with Example III.

| Sample No. | Resin [1] | CaCl₂ | Slaking time [2] |
|---|---|---|---|
| | Per cent | Per cent | |
| 1 | 0 | 0 | 19 mins. |
| 2 | 0 | 2 | 42 mins. |
| 3 | 0 | 5 | 1 hr. 13 mins. |
| 4 | 2 | 0 | Not slaked at 21 days. |

[1] Substantially petroleum-hydrocarbon insoluble pine wood resin.
[2] Average of two runs.

EXAMPLE V

A blend of cinders and Cecil clay was made into soil pats and stabilized as follows:

| Sample No. | Resin [1] | CaCl₂ |
|---|---|---|
| | Per cent | Per cent |
| 1 | 0 | 0 |
| 2 | 3 | 0 |
| 3 | 1 | 4 |
| 4 | 0 | 5 |

[1] Substantially petroleum-hydrocarbon insoluble pine wood resin.

These samples were washed uniformly for 15 minutes, at which time the control sample, No. 1, disintegrated completely. The order of resistance to disintegration of the samples was No. 2, No. 3, and No. 4.

EXAMPLE VI

A one-half mile section of a soil road was constructed using .4 pound of the substantially petroleum-hydrocarbon insoluble pine wood resin and 1.4 pounds of calcium chloride per square yard of road. This was thoroughly mixed with 2 to 3 inches of the top soil of the road. The road held up better and showed less frost action during the winter and in rainy weather was less slippery and dried out faster than a control section using only calcium chloride.

EXAMPLE VII

A sample of Georgia limerock, a cement-like material, was pulverized to pass a 40 mesh screen. A control sample was compacted into a pellet one inch in diameter and one-half inch high using pressures to give a compaction comparable to Proctor. A similar pellet was formed, but having mixed therein 2% of the substantially petroleum-hydrocarbon insoluble pine wood resin. These samples, after thorough drying, were placed in ⅛ inch of water and the capillary rise was observed. The following results were obtained:

| Time | Control sample | Resin sample [1] |
|---|---|---|
| 1 minute | Wicked to top | |
| 2 minutes | Practically all wetted swelling in center on top. | Irregular ¹⁄₁₆ inch. |
| 3 minutes | All wetted, slaked badly | Irregular ³⁄₃₂ inch trace slake. |
| 9 minutes | | |
| 14 minutes | | ⅛ inch. |
| 24 minutes | Rapidly losing form | |
| 39 minutes | | Top wet line shading off. |
| Next day | As above | Wet ¾ way to top—shading off. |

[1] Substantially petroleum-hydrocarbon insoluble pine wood resin.

EXAMPLE VIII

A trench was dug for laying an underground iron pipe and the soil to be packed about the pipe was mixed with about 2% of the substantially petroleum-hydrocarbon insoluble pine wood resin. The pipe was then placed in the trench and the soil was filled in and tamped. It was found that the resin-treated soil was not subject to swelling and frost heave, and protected the pipe against these contingencies. The soil remained substantially dry and thus protected the pipe against corrosion.

From the foregoing description and examples, it will be seen that the present invention provides a method of stabilizing soils whereby improved roads and the like are produced. The small amount of resin added to the soil greatly improves its resistance to erosion and slaking out of silt or clay-like materials. Both the tensile and compressive strength of the soils are greatly increased, thus giving the construction formed of stabilized soil better all-round wearing characteristics.

The foregoing advantages can be attained also when using the resin with other materials, such as deliquescent substances or cementitious matter. Soils of various type and grades can be readily stabilized in a simple and economical manner.

It will be understood that the details and examples hereinbefore set forth are illustrative only and that the invention as broadly described and claimed is in no way limited thereby.

What I claim and desire to protect by Letters Patent is:

1. Stabilized soil containing powdered substantially petroleum-hydrocarbon insoluble pine wood resin.
2. Stabilized soil containing between about .12 and 10% powdered substantially petroleum-hydrocarbon insoluble pine wood resin.
3. Stabilized soil containing between about .25 and 2.5% powdered substantially petroleum-hydrocarbon insoluble pine wood resin.
4. Stabilized soil containing between about 1 and 2% powdered substantially petroleum-hydrocarbon insoluble pine wood resin.
5. Stabilized soil containing powdered substantially petroleum-hydrocarbon insoluble pine wood resin and deliquescent material.
6. Stabilized soil containing between about .25 and 2.5% powdered substantially petroleum-hydrocarbon insoluble pine wood resin and between about .3 and 5% calcium chloride.
7. A method of stabilizing soil which comprises mixing with the soil a powdered substantially petroleum-hydrocarbon insoluble pine wood resin.
8. A method of stabilizing soil which comprises mixing with the soil between about .25 and 2.5% of a powdered substantially petroleum-hydrocarbon insoluble pine wood resin.
9. A method of stabilizing soil which comprises mixing with the soil between about 1 and 2% of a powdered substantially petroleum-hydrocarbon insoluble pine wood resin.
10. A method of stabilizing soil which comprises mixing with the soil a powdered substantially petroleum-hydrocarbon insoluble pine wood resin and a deliquescent material.
11. A method of stabilizing soil which comprises mixing with the soil between about .25 and 2.5% of a powdered substantially petroleum-hydrocarbon insoluble pine wood resin and between about .3 and 5% calcium chloride.

ABRAHAM B. MILLER.